3,389,096
WEAK-BASE ANION EXCHANGE RESINS CONTAINING AMIDE SUBSTITUENTS
Irving M. Abrams, Redwood City, Richard G. Bufton, San Jose, and Frederick L. Burnett III, Sunnyvale, Calif., assignors to Diamond Shamrock Corporation, a corporation of Delaware
No Drawing. Filed Oct. 18, 1965, Ser. No. 497,527
15 Claims. (Cl. 260—2.1)

ABSTRACT OF THE DISCLOSURE

A weak-base anion exchange resin containing anion-active radical substituents of the structure:

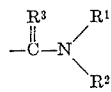

wherein $R^1$ is hydrogen, alkyl, aminoalkyl or amino-aza-alkyl; $R^2$ is hydrogen or alkyl; and $R^3$ is oxygen, NH or sulfur; is prepared by copolymerizing a polymerizable unsaturated nitrile with an aromatic compound containing at least two polymerizable unsaturated groups to form a crosslinked polymeric matrix and then reacting this matrix with an alkylene polyamine in the presence of water.

---

This invention relates to ion exchange resins, and more particularly to a novel series of weak-base anion exchange resins derived from polymerizable unsaturated nitriles.

Weak-base anion exchange resins in general use at the present time are principally of three types. The first of these consists of aminated phenol-formaldehyde and amine-formaldehyde resins, as described in U.S. Patent No. 2,290,345. The second group comprises chloromethylated and aminated styrene-divinyl-benzene resins, as described in U.S. Patent No. 2,591,574. The third group is formed by crosslinking aliphatic amines with compounds such as epichlorohydrin or glycerol dichlorohydrin, as described in U.S. Patent 2,469,694.

D'Alelio, in U.S. Patent No. 2,697,079, has disclosed a fourth variety of weak-base anion exchange resin which is formed by copolymerizing an unsaturated nitrile, such as acrylonitrile, with a crosslinking agent, such as divinylbenzene, and then reducing the nitrile groups in the thus-formed resin to amine groups by hydrogenation over a catalyst such as platinum or Raney nickel. Because of the high cost of the catalyst used in the hydrogenation step, this resin is expensive to make and is not in wide use.

The present invention is directed to a series of weak-base anion exchange resins which may be easily and relatively inexpensively prepared, and which have a variety of properties rendering them useful in a number of different fields and for a wide range of applications. In general, the resins of this invention consist of a crosslinked polymeric matrix obtained by copolymerizing a polymerizable unsaturated nitrile with a crosslinking compound containing at least two polymerizable unsaturated groups and attached to said polymeric matrix substituent anion-active radicals having the following structure:

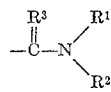

wherein $R^1$ is selected from the group consisting of hydrogen, alkyl, aminoalkyl and amino-aza-alkyl, wherein the alkyl radical contains about 2 to 12, preferably 2 to 6 carbon atoms; $R^2$ is selected from the group consisting of hydrogen and an alkyl containing about 2 to 12, preferably 2 to 6, carbon atoms; and $R^3$ is selected from the group consisting of oxygen, NH, and sulfur, preferably $R^3$ is selected from the group consisting of oxygen and NH. When $R^1$ is either hydrogen or alkyl, $R^3$ is NH. More specifically, the present invention includes a base resin matrix containing anion-active substituents which may be identified as "amide," "amidine" and "thioamide," preferably the "amide" and "amidine" substituents as described hereinafter.

BASE RESIN

The base resin used for the preparation of the anion exchange resins of the present invention is prepared by copolymerizing an unsaturated nitrile with an aliphatic or aromatic crosslinking agent containing at least two polymerizable unsaturated groups. Examples of suitable nitriles are acrylonitrile, methacrylonitrile, vinyl benzyl cyanide and the like with acrylonitrile and methacrylonitrile, being preferred. Examples of suitable crosslinking agents include ethylene glycol dimethacrylate, divinylbenzene, divinyltoluene, trivinylbenzene and the like and also mixtures of such compounds with similar monovinyl materials, such as ethylvinylbenzene. The crosslinking comonomer should comprise about 1–40% and preferably about 5–20% of the total monomer weight. Alternatively, linear polyacrylonitrile may be employed in place of the usual acrylonitrile crosslinked copolymer to prepare the anion resins. By using a polyamine, such as diethylene triamine, as the reactant the reaction of both of the terminal amine groups on the one polyamine molecule serves to tie separate chains of the homopolymer together, thus resulting in a cross-linked resin. The product would have weak-base anion exchange capacity because of the remaining unreacted secondary amine group in each diethylene triamine molecule.

Any polymerization method that will provide a suitable granular product may be used. In a preferred embodiment of the invention, the reaction is carried out in aqueous suspension. For this purpose, the monomeric reactants are charged to an aqueous medium containing suitable dispersing agents and a polymerization catalyst, such as dibenzoyl peroxide, benzoyl hydroperoxide, diacetyl peroxide, dichlorobenzoyl peroxide, di-t-butyl peroxide, butyl hydroperoxide, cyclohexanone peroxide, methyl ethyl ketone peroxide, dilauroyl peroxide or azobisisobutyrolnitrile. The reaction mixture is vigorously agitated and is maintained at a temperature of about 25–100° C., preferably about 45–70° C., as polymerization takes place. The polymerization product is obtained in the form of discrete granules.

It has been found that when the polymerization reaction is carried out in the presence of a plasticizer, the product has superior properties including macroporosity, increased physical strength and better resistance to sudden changes in pH. The plasticizer is added to the monomer mixture in an amount equal to approximately 5–30%, preferably about 10–20%, of the monomer weight. Suitable plasticizers include, for example, dioctyl phthalate, dioctyl sebacate, diisooctylsebacate, dioctyl azelate, diisodecyl phthalate and the like with diisodecyl phthalate being preferred.

While the preferred base resins are those prepared from acrylonitrile or methacrylonitrile and divinylbenzene as described hereinabove, other types of base resins may also be used. For example, chloromethylated polystyrene, crosslinked with divinylbenzene or with methylene bridges as described in U.S. Patent 2,900,352, may be reacted with sodium cyanide to form a polyvinylbenzonitrile resin. Other suitable matrix resins will be apparent to those skilled in the art.

"AMIDE," "AMIDINE" AND "THIOAMIDE" RESINS

The "amide," "amidine" and "thioamide" resins are characterized by substituent radicals having the structure

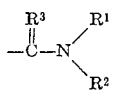

wherein $R^1$ is hydrogen, alkyl, aminoalkyl or, preferably, amino-aza-alkyl such as —$R^4NHR^4NH_2$, $R^4$ being alkylene containing about 2 to 12, preferably 2 to 6 carbon atoms; $R^2$ is hydrogen or alkyl, preferably hydrogen; and $R^3$ is oxygen, NH or sulfur, preferably oxygen or NH. When $R^1$ is hydrogen or alkyl, $R^3$ is NH. The "amide" and "amidine" resins are produced by reacting the base resin with an alkylene polyamine. When the reaction is carried out in the presence of water, the preferred method, the product has the amide structure. If water is absent from the reaction mixture, the amidine structure is believed to be produced. The "thioamide" resins may be produced by first reacting hydrogen sulfide with the base resin, this product is then condensed with an amine to produce a thioamide type linkage with weak-base capacity.

Suitable amines which may be used according to the present invention include, in general, polyfunctional primary and secondary aliphatic amines containing about 2 to 12, preferably 2 to 6 carbon atoms in the molecule. Typical examples are diethylene triamine- 1,6-diamino hexane, bis(hexamethylene)triamine, diethyl amino propylamine, bis(trimethylene)triamine and the like. Additional crosslinking through the polyamine groups possibly may occur as indicated hereinabove.

To prepare the amide resin, the base resin is reacted with the amine in the presence of water. The percentage (by weight) of water in the amine-water mixture is about 5–30%, preferably about 10%. The reactants are heated together at a temperature of about 100° to 200° C., preferably about 110° to 130° C. Desirably, an excess of amine is used; a molar ratio of amine to resin (on a nitrile monomer basis) of about 2:1 is the optimum, but ratios between about 5:1 and 1:2 are suitable. The reaction time may be about 10–20 hours, and is usually about 15–16 hours when the reaction temperature is about 130° C.

The preparation of an "amidine" resin is effected by a method similar in all respects to that described above except that water is excluded from the reaction mixture.

"Amide" resins of the present invention, when prepared from acrylonitrile, have an extremely high weak-base capacity, frequently in the region of 9.4 milliequivalents per gram. They are particularly useful where a resin of high capacity is desired and extended contact with mineral acid or alkali at high temperatures is not anticipated. However, similar resins made with methacrylonitrile have lower weak-base capacity, but are considerably more stable under conditions of high acidity and are particularly useful under more severe conditions.

EVALUATION OF RESINS

The most commonly used index of an ion exchange resin's performance is its capacity. Capacity, usually expressed in equivalents per liter, is (for a weak-base anion exchange resin) a measure of the amount of acid which a given volume of resin in the free-base form will neutralize. It is measured by regenerating the resin with excess base and rinsing the regenerated resin with water, and then passing therethrough an excess of a standard acid (usually hydrochloric acid) solution. The effluent is titrated with standard base to determine the amount of acid, expressed in terms of milliequivalents, adsorbed by the resin.

Because of the incomplete reaction of the nitrile groups with amine, or because of reaction followed by hydrolysis, there may be some free carboxylic acid groups in the resins of this invention which are detrimental to their use as weak-base resins. It is necessary, therefore, to measure the carboxylic acid capacity of the resin as well as its weak-base capacity. Carboxylic acid capacity is measured by titrating an accurately measured aliquot of the effluent with standard silver nitrate solution. From the sodium hydroxide titer, determined in the measurement of weak-base capacity, can be obtained the amount of hydrochloric acid in the effluent. The silver nitrate titer is proportional to the volume of total chlorides in the effluent, and from these two figures can be determined the amount of chloride resulting from sodium chloride. Since any sodium ion in the effluent must be the result of the elution of sodium ions held by carboxylic acid groups on the resin, the carboxylic acid capacity of the resin may be thus determined. This capacity is a direct measure of the degree of decomposition of the resin by hydrolysis. The most desirable resins are those which have high weak-base capacities and low carboxylic acid capacities.

Hydrolytic stability of a resin of this invention is evaluated by refluxing the resin with 6 N hydrochloric acid overnight. Following this treatment, total capacity and carboxylic acid capacity are again measured.

Example 1.—Preparation of acrylonitrile-divinylbenzene base resin

A three-necked flask, fitted with a stirrer and immersed in a water bath at 60° C., is charged with 1250 ml. of water, 420 grams of sodium chloride and 2.5 grams of Natrosol 250, a non-ionic water-soluble cellulose ether dispersant. The stirrer is started and a mixture of 395 grams of acrylonitrile, 84.5 grams of divinylbenzene (55.5% in ethylvinylbenzene) and 3 grams of dibenzoyl peroxide is added. Polymerization occurs as the mixture is stirred at 65° C., over a 16-hour period. At the end of this time, the mixture is cooled and the copolymer beads are separated by filtration and air-dried.

Example 2.—Preparation of acrylonitrile-divinylbenzene base resin

The procedure of Example 1 is followed except that 81.5 grams of diisodecyl phthalate is combined with the acrylonitrile-divinylbenzene-benzoyl peroxide mixture. The resulting polymer beads have greater strength and porosity than those prepared by the method of Example 1. Porosity is measured by the adsorption of large molecules from aqueous solution by the anion exchange resins made from the various polymers under consideration.

Example 3.—Preparation of "amide" acrylonitrile-divinylbenzene resin

A three-necked flask, fitted with stirrer and reflux condenser, is charged with 9.6 grams of the acrylonitrile-divinylbenzene base resin prepared according to Example 2 (about 0.128 equivalent based on acrylonitrile). A mixture of 20.6 grams (0.2 mole) of diethylene triamine and 2.3 grams of water is added, and the reaction mixture is heated with stirring for 16 hours at 125° C. The resulting anion exchange resin beads are filtered and washed with dilute hydrochloric acid.

The resin prepared by this method contains a weak-base capacity of 100 milliequivalents and negligible silver nitrate capacity. Upon hydrolysis with 6 N hydrochloric acid overnight at reflux temperature the resin is found to have 69 milliequivalents of weak-base capacity and 31 milliequivalents of silver nitrate capacity.

Example 4.—Preparation of methacrylonitrile-divinylbenzene base resin

A three-necked flask, fitted with a stirrer, nitrogen inlet and condenser set downward for distillation, is charged with 175 ml. of water, 58.2 grams of sodium chloride and 0.35 gram of Natrosol 250 dispersant. Stirring is started and a mixture of 75 ml. (0.895 mole) of methacrylonitrile, 9.25 ml. of diisodecyl phthalate, 10.7 ml. of 58.8% divinylbenzene and 0.36 gram of benzoyl peroxide is added. The mixture is stirred vigorously under nitrogen at 70° C. for 16 hours. The resin beads thus obtained are washed with hot water, rinsed with methanol and dried.

Example 5.—Preparation of "amide" resin based on methacrylonitrile-divinylbenzene resin A mixture of 9.75 grams (111 milliequivalents based on methacrylonitrile) of the resin prepared by the method of Example 4 and 23 ml. of a 90% aqueous solution of diethylene triamine is stirred in a nitrogen atmosphere at reflux temperature overnight. The resulting anion exchange resin beads are washed with dilute hydrochloric acid and water. The weak-base capacity of the product thus obtained is 100 milliequivalents with a negligible silver nitrate capacity. Upon hydrolysis with 6 N hydrochloric acid as described in Example 3, the resin is found to have a weak-base capacity of 84 milliequivalents and a silver nitrate capacity of 16 milliequivalents. In comparison to the resin of Example 3, the resins prepared from methacrylonitrile have lower weak-base capacity, but are more stable under conditions of high acidity.

Example 6.—Preparation of "amidine" resin based on acrylonitrile-divinylbenzene resin The procedure of Example 3 is followed, except that anhydrous diethylene triamine is used. There is obtained an "amidine" anion exchange resin with a weak-base capacity of 100 milliequivalents. Similar products made from bis-hexamethylene triamine and amino-bis-propylamine have capacities of 88 and 92 milliequivalents, respectively.

It is to be understood that the invention is not limited by the specific examples and embodiments described hereinabove, but includes such changes and modifications as may be apparent to one skilled in the art upon reading the appended claims.

What is claimed is:

1. A weak-base anion exchange resin consisting of a crosslinked polymeric matrix obtained by copolymerizing a polymerizable unsaturated nitrile with an aromatic compound containing at least two polymerizable unsaturated groups; said polymeric matrix, by reaction of the matrix with an alkylene polyamine in the presence of water, having substituent anion-active radicals of the structure:

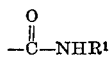

wherein $R^1$ is a member selected from the group consisting of aminoalkyl and amino-aza-alkyl.

2. An anion exchange resin according to claim 1 wherein the substituent radical is

and wherein $R^4$ is alkylene.

3. An anion exchange resin according to claim 2 wherein $R^4$ is an ethylene radical.
4. An anion exchange resin according to claim 2 wherein $R^4$ is a propylene radical.
5. An anion exchange resin according to claim 2 wherein $R^4$ is a hexylene radical.
6. An anion exchange resin according to claim 1 wherein the substituent radical is

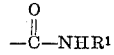

and wherein $R^1$ is an aminoalkyl radical.

7. An anion exchange resin according to claim 6 wherein the amino alkyl radical contains 6 carbon atoms.
8. A method for the preparation of a weak-base anion exchange resin according to claim 1, which comprises the steps of (1) copolymerizing, in aqueous suspension, a polymerizable unsaturated nitrile with an aromatic compound containing at least two copolymerizable unsaturated groups, said aromatic compound comprising about 1–20% of the total monomer weight, and (2) reacting the resin thus formed with an alkylene polyamine in the presence of water.
9. The method of claim 8 wherein plasticizer is present in the monomer mixture of step (1).
10. The method of claim 8 wherein the amine is diethylene triamine.
11. The method of claim 8 wherein the amine is bis-(trimethylene)triamine.
12. The method of claim 8 wherein the amine is bis-(hexamethylene)triamine.
13. The method of claim 8 wherein the amine is 1,6-diamino hexane.
14. The method of claim 8 wherein the nitrile is acrylonitrile and the aromatic compound is divinylbenzene.
15. The method of claim 8 wherein the nitrile is methacrylonitrile and the aromatic compound is divinylbenzene.

No references cited

WILLIAM H. SHORT, *Primary Examiner.*

M. GOLDSTEIN, *Assistant Examiner.*